US008043065B2

(12) United States Patent
Kyriakides

(10) Patent No.: US 8,043,065 B2
(45) Date of Patent: Oct. 25, 2011

(54) WIND TURBINE BLADE WITH PREFABRICATED LEADING EDGE SEGMENTS

(75) Inventor: Steven Alan Kyriakides, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 375 days.

(21) Appl. No.: 12/434,197

(22) Filed: May 1, 2009

(65) Prior Publication Data

US 2010/0278654 A1    Nov. 4, 2010

(51) Int. Cl.
*F01D 5/18*    (2006.01)

(52) U.S. Cl. ............ 416/224; 416/223 R; 416/226; 416/230; 416/232; 416/241 R

(58) Field of Classification Search .......... 416/146 R, 416/223 R, 224, 226, 230, 232, 241 A, 241 R, 416/500

See application file for complete search history.

(56) References Cited

U.S. PATENT DOCUMENTS

| | | | | |
|---|---|---|---|---|
| 4,118,147 | A * | 10/1978 | Ellis ........................ | 416/230 |
| 5,314,309 | A * | 5/1994 | Blakeley et al. ........... | 416/226 |
| 5,782,607 | A | 7/1998 | Smith et al. | |
| 6,457,943 | B1 | 10/2002 | Olsen et al. | |
| 6,508,000 | B2 * | 1/2003 | Burke et al. ............... | 29/889.1 |
| 6,612,810 | B1 | 9/2003 | Olsen et al. | |
| 7,040,864 | B2 | 5/2006 | Johansen et al. | |
| 7,351,040 | B2 | 4/2008 | Livingston et al. | |
| 7,618,712 | B2 * | 11/2009 | Sabol et al. .................. | 428/469 |
| 2002/0148115 | A1 * | 10/2002 | Burke et al. ................ | 29/889.1 |
| 2003/0129061 | A1 * | 7/2003 | Finn et al. ................... | 416/224 |
| 2004/0253114 | A1 | 12/2004 | Gunneskov et al. | |
| 2008/0145229 | A1 * | 6/2008 | Llorente Gonzalez et al. ............................ | 416/230 |
| 2008/0159870 | A1 | 7/2008 | Hong | |
| 2008/0206062 | A1 * | 8/2008 | Sanz Pascual et al. ....... | 416/226 |
| 2009/0196751 | A1 * | 8/2009 | Jacobsen et al. .......... | 416/146 R |
| 2011/0058934 | A1 * | 3/2011 | James ......................... | 415/177 |

FOREIGN PATENT DOCUMENTS

| | | |
|---|---|---|
| WO | WO 96/02417 | 2/1996 |
| WO | WO 98/46418 | 10/1998 |
| WO | WO 01/46582 | 6/2001 |

* cited by examiner

*Primary Examiner* — Michael Labentritt
(74) *Attorney, Agent, or Firm* — Dority & Manning, P.A.

(57) ABSTRACT

A wind turbine rotor blade includes first and second shell components joined together at a trailing edge of the blade. Each shell component includes a forward edge. At least one leading edge segment is joined to the shell components and aligned along a longitudinal length of the blade. The leading edge segment has an open-ended cross-sectional profile defined by an arcuate skin having first and second longitudinal edges and first and second end faces. The longitudinal edges of the leading edge segment are joined to the forward edge of the first shell component at a first bond line, and joined to the forward edge of the second shell component at a second bond line. The leading edge of the blade between the first and second bond lines is a continuous unbroken surface between the bond lines.

21 Claims, 6 Drawing Sheets

WIND TURBINE BLADE WITH PREFABRICATED LEADING EDGE SEGMENTS

FIELD OF THE INVENTION

The present invention relates generally to wind turbine rotor blades, and more particularly to a wind turbine rotor blade having one or more prefabricated leading edge components

BACKGROUND

Wind power is considered one of the cleanest, most environmentally friendly energy sources presently available, and wind turbines have gained increased attention in this regard. A modern wind turbine typically includes a tower, generator, gearbox, nacelle, and one more rotor blades. The rotor blades capture kinetic energy from wind using known foil principles, and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The construction of a modern wind turbine rotor blade generally includes upper and lower shell components bonded at a leading and trailing edge of the blade, spar caps, and one or more shear webs. The skin, typically manufactured from layers of fiber composite and a lightweight core material, forms the exterior aerodynamic foil shape of the rotor blade. The spar caps provide increased rotor blade strength by integrating one or more structural elements running along the length of the rotor blade on both interior sides of the rotor blade. Shear webs are structural beam-like components running essentially perpendicular between the top and bottom spar caps and extending across the interior portion of the rotor blade between the outer skins. Spar caps have typically been constructed from glass fiber reinforced composites, though some larger blades are beginning to include spar caps constructed from carbon fiber reinforced composites.

With conventional constructions, the leading edge of the wind turbine blade is an area of concern. The bonding of the shell components at the leading edge is difficult to control. Overbite or underbite between the shell components can occur, often causing extensive rework of the blade. The thickness of the bond can vary from blade to blade, and can often drift outside of a design tolerance. The leading edge bond between the shell components can result in a blade where the most dimensional uncertainty is at a very critical aerodynamic location on the blade. In addition, the leading edge of the turbine blade is highly susceptible to erosion and weathering, and can be damaged during transportation and erection of the wind turbine. These conditions lead to costly on-site repairs.

Accordingly, there is a need for a wind turbine rotor blade design that addresses at lest certain of the present disadvantages associated with blades having shell components bonded together at the leading edge of the blade.

BRIEF DESCRIPTION OF THE INVENTION

The present invention provides for a wind turbine rotor blade that incorporates one or more prefabricated leading edge segments. These segments can be manufactured with precisely controlled geometries, and do not include a leading edge bond. The blades provide a solution to several of the problems associated with conventional blades having shell components bonded together at the leading edge of the blade. Additional aspects and advantages of the invention are set forth in part in the following description, or may be obvious from the description, or may be learned through practice of the invention.

A wind turbine rotor blade is provided having a first shell component and a second shell component. The shell components are joined together at the trailing edge of the blade. Each of the shell components further includes a forward edge. At least one, and in a particular embodiment, a plurality of leading edge segments are joined to the shell components and aligned along the longitudinal length of the blade so as to define a continuous leading edge of the blade. The leading edge segments have an open-ended cross-sectional profile defined by an arcuate skin with first and second longitudinal edges and first and second end faces. The longitudinal edges of the leading edge segments are joined to the forward edge of the first shell component at a first bond line, and joined to the forward edge of the second shell component at a second bond line. The end faces of adjacent leading edge segments may be bonded together as well. With this construction, the leading edge portion of the blade between the first and second bond lines is a continuous unbroken surface defined by the aligned leading edge segments.

The present invention also encompasses a kit for forming a wind turbine rotor blade from component parts. The kit may include a first shell component and a second shell component, with each of the shell components having a forward edge and a trailing edge. One or more leading edge segments are also provided, with each leading edge segment having an open-ended cross-sectional profile defined by an arcuate skin with first and second longitudinal edges and first and second end faces. The leading edge segments and the first and second shell components are configured relative to each other such that when assembled, the shell components define a bonded trailing edge of the blade, and the longitudinal edges of the leading edge segments are joined to the forward edge of the first shell component at a first bond line, and joined to the forward edge of the second shell component at a second bond line. With this kit configuration, when assembled, the parts define a blade with a leading edge that is a continuous unbroken surface defined by the skins of the aligned leading edge segments between the first and second bond lines.

It should be readily appreciated, that the other attributes and characteristics of the various embodiments described herein relate to the individual components of the kit embodiments as well.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
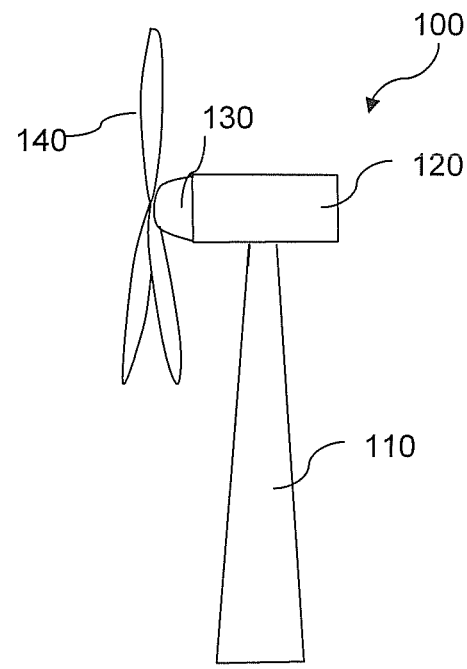
FIG. 1 is a diagrammatic illustration of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIG. 1 is a schematic view of a conventional wind turbine 100. The wind turbine 100 includes a tower 110 with a machine nacelle 120 mounted at the top of the tower. A hub 130 having any number of rotor blades 140 is mounted to a lateral end of the machine nacelle 120.

Figure 2:
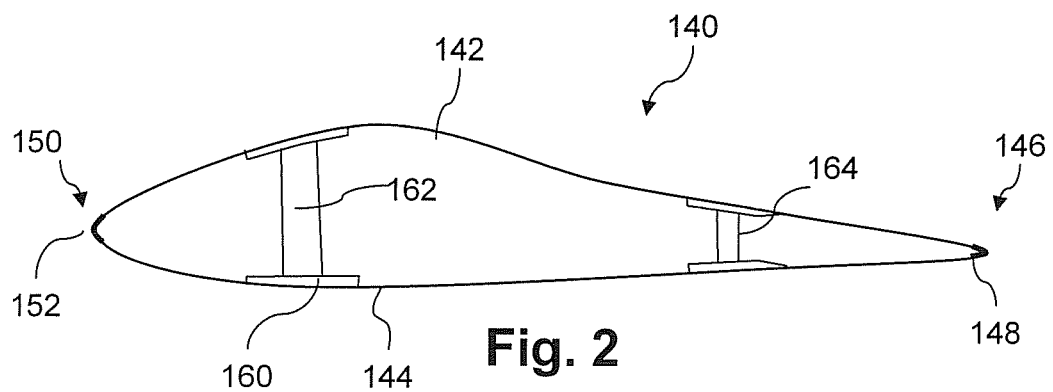
FIG. 2 is a cross-sectional diagrammatic view of a conventional wind turbine blade.

Referring to FIG. 2, a typical configuration of a conventional rotor blade 140 includes a suction side shell component 142 and a pressure side shell component 144. The shell components 142, 144 are bonded together at a first bond 148 at the trailing edge 146 of the blade, and at a second bond 152 at the leading edge 150 of the blade. For structural rigidity and support, typically spar caps 160 are attached to the inside surface of the shell components 142, 144 along the length thereof, with a shear web 162 connected between the components. With larger turbine blades, one or more additional braces 164 may be included for added support. As discussed above, the leading edge 150 is a critical aerodynamic section of the blade 140, and the presence of the leading edge bond 152 and conventional construction techniques can be problematic.

Figure 3:
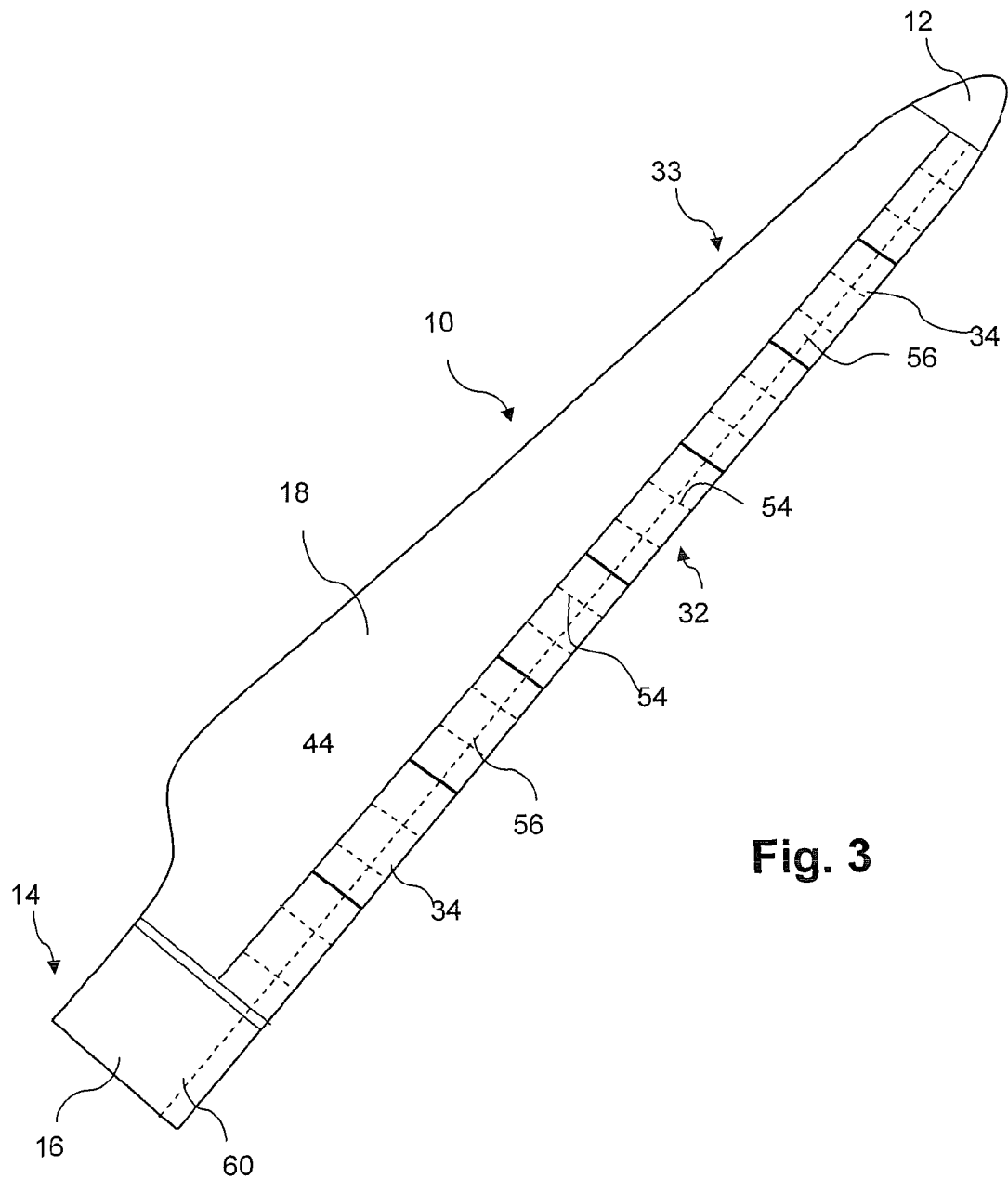
FIG. 3 is a planar view of an embodiment of a wind turbine blade incorporating a plurality of leading edge segments according to aspects of the present invention.
Figure 4:
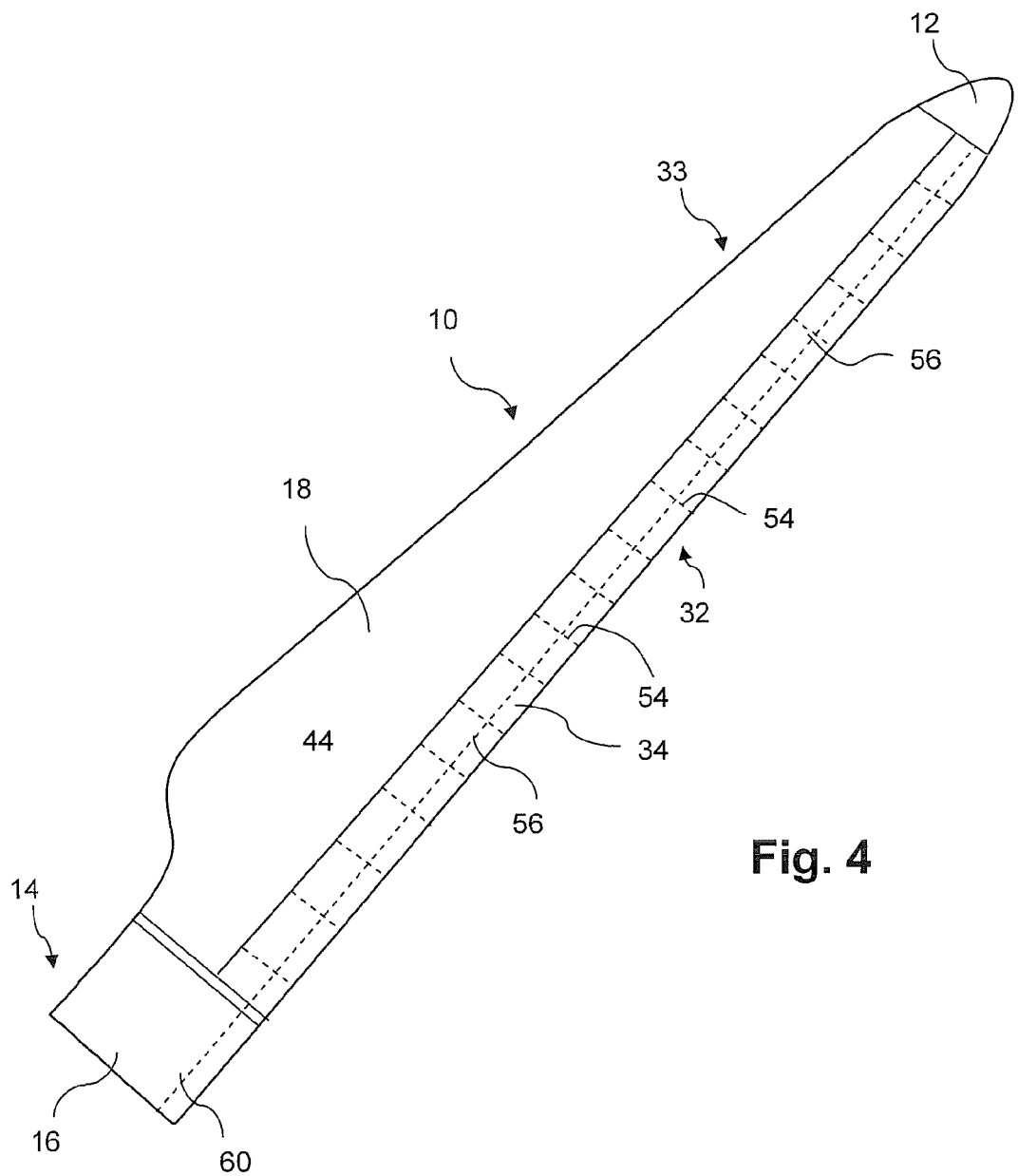
FIG. 4 is a planar view of an embodiment of a wind turbine blade incorporating a single leading edge segment according to aspects of the present invention.
Figure 5A:
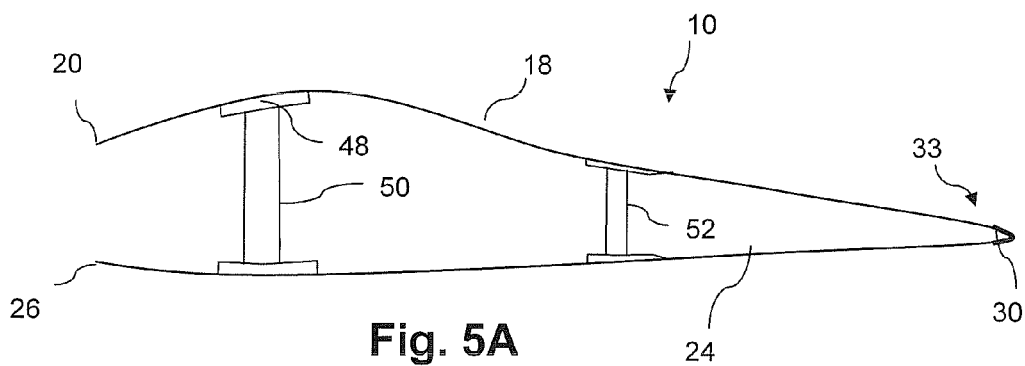
FIG. 5A is a cross-sectional view of an embodiment of a wind turbine blade in accordance with aspects of the invention.

FIGS. 3 and 4 are illustrations of embodiments of a wind turbine rotor blade 10 in accordance with aspects of the invention. The blade 10 includes a first shell component 18 and a second shell component 24 (FIG. 4A). The shell components 18, 24 may be individually formed, and may include inner and outer skins, and a core material sandwiched between the inner and outer skins. The inner and outer skins may be a fiber reinforced material, and the core material may be a light-weight material, such as balsa wood, extruded polystyrene foam, and the like, as is known in the art. The first shell component 18 includes a forward edge 20 (FIG. 5A), and the second shell component 24 includes a forward edge 26 (FIG. 5A). The shell components include respective trailing edges that are joined together at the trailing edge 33 of the blade 10. Typically, the trailing edges may be bonded at a bond point 30 (FIG. 5A) at the trailing edge 33.

Figure 5B:
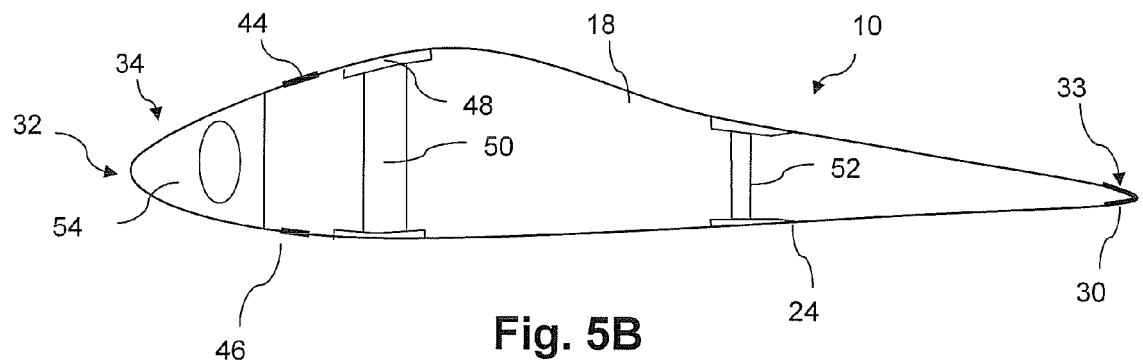
FIG. 5B is a cross-sectional view of the embodiment of FIG. 4A with a leading edge segment attached to the shell component.

Referring to FIGS. 5A and 5B, spar caps 48 may be attached to the inner skin surfaces of the respective shell components 18, 24, with a spar or shear web 50 connected between the spar caps 48. As generally understood, the spar caps 48 and web 50 provide structural support and rigidity to the blade 10. In addition, any manner of additional braces 52 may be included in construction of the blade 10, particularly for larger turbine blades. It should be appreciated that any manner of internal structural support configuration is within the scope and spirit of the invention.

FIG. 3 illustrates an embodiment wherein a plurality of leading edge segments 34 are joined to the shell components 18, 24 and are aligned along a longitudinal length of the blade 10 so as to define a continuous leading edge 32 for the blade 10. FIG. 4 illustrates an alternate embodiment wherein a single edge segment 34 is joined to the shell components 18, 24 to define the continuous leading edge 32 for the blade 10. It should be appreciated that the invention encompasses any number of the leading edge segments 34, at that different economic, manufacturing, and structural considerations may apply to the different embodiments. For illustrative purposes, the embodiment of a blade 10 incorporating a plurality of the leading edge segments is described in greater detail herein.

The leading edge segments 34 may complete the blade 10 from the tip 12 to the root 14 of the blade 10. In an alternative embodiment, fewer leading edge segments may be utilized, wherein a portion of the blade leading edge 32 is defined by the shell components 18, 24, or other structure. The leading edge segment 34 closest to the root 14 may also attach directly to a root ring 16, or other structure of the blade 10. Likewise, the leading edge segment 34 closest to the tip 12 may attach to a tip component, which may be a section of the shell components 18, 24, or a separate tip structure. When completed the blade 10 as depicted in FIG. 3 has a designed blade profile, length, and other desired characteristics. The complete blade 10 may have a swept shape giving it a curved contour running from the tip 12 to the root 14. In an alternative embodiment, the blade 10 may have a non-swept shape.

Figure 6:
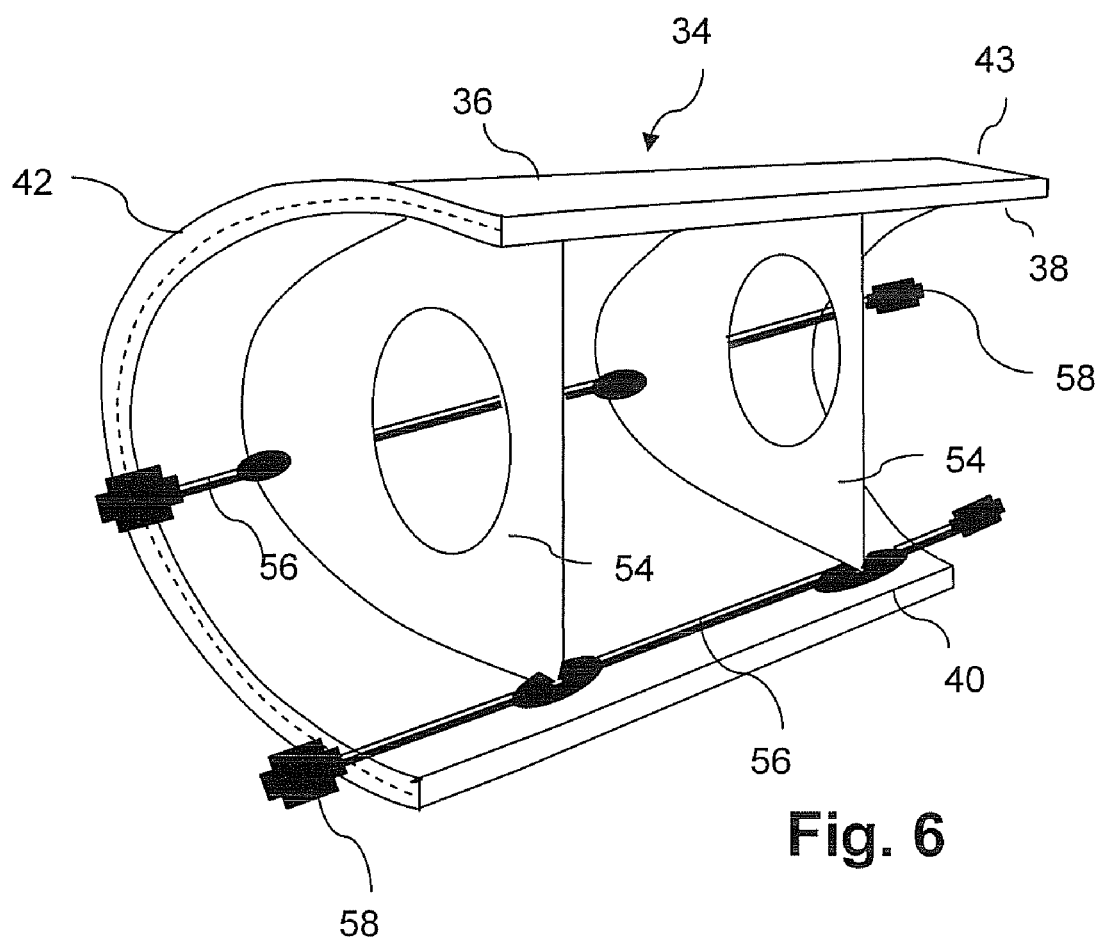
FIG. 6 is a cross-sectional perspective view of an embodiment of a leading edge segment of a wind turbine blade in accordance with aspects of the invention.

Referring to FIGS. 5A through 6, the leading edge segments 34 have an arcuate profile that defines a desired aerodynamic shape of the blade leading edge 32. The edge segments may be filled with a light-weight material, or may be essentially hollow with an open-ended cross-sectional profile that is defined by the skin 36. The skin 36 includes first and second longitudinal edges 38, 40, and first and second end faces 42, 43. The longitudinal edges 38, 40 of each leading edge segment 34 are joined to the forward edge 20 of the first shell component 18 and a forward edge 26 of the second shell component 24, as illustrated in FIG. 5B. The leading edge segments 34 may be bonded to the shell components 18, 24 by any conventional bonding technique such that a bond line 44 is formed at the juncture of the forward edge 20 of shell component 18 and longitudinal edge 38 of the leading edge segment 34. Likewise, a bond line 46 is formed at the juncture of longitudinal edge 40 and the forward edge 26 of the second shell component 24. With this unique construction, the leading edge portion 32 of the blade 10 is defined by the continuous unbroken surface of the leading edge segment 36 between the bond lines 44 and 46. Thus, the leading edge portion 32 does not include a bond line at the forward most edge.

The leading edge segments 34 may be prefabricated from a single piece of skin or shell material 36. For example, the skin 36 may be molded as a single integral piece, and may be made from the same material as the shell components 18, 24. The prefabricated leading edge components 34 may be formed from a thermoplastic or thermoset material, as well as a glass, carbon, or particle-reinforced composite material. In addition, the leading edge segments 34 may be formed from a material or treated with a coating or other application to provide the leading edge of the blade 10 with certain desired characteristics as compared to the shell components 18, 24. For example, the leading edge segments may be formed of a material that does not require painting, and which may include a UV resistant material or coating, or other material or coating that enhances weathering and erosion resistance. The leading edge segments 34 may have a different color or other visual characteristic as compared to the shell components 18, 24. It should be readily appreciated that the construction and materials for the leading edge segments 34 are not a limitation of the present invention.

Referring to FIG. 5A, it may be desired that the forward edges 20, 26 of the respective shell components 18, 24 are forward of the spar caps 48 and sheer web 50, but in relatively close proximity to the spar caps and sheer web such that the structural rigidity and support of these components is relatively close to the bond lines 44, 46 with the leading edge segments 34.

With particular embodiments, it may be desired that the end faces 42, 43 of adjacent leading edge segments 34 are also bonded or otherwise joined together along the length of the blade 10. The end faces 42, 43 may include any manner of splice or joint configuration, such as a dove-tail joint or lap-splice configuration, to ensure positive interlocking engagement between the respective adjacent end faces.

It should also be appreciated that any manner of conventional joint configuration, such as a dove-tail joint or lap-splice configuration, may also be included between the longitudinal edges 38, 40 of the leading edge segments 34 and the forward edges 20, 26 of the respective shell components 18, 24, or between the end faces of the most proximal and most distal edge components (or the end faces of the single edge component embodiment of FIG. 4) and the respective root and tip structure of the blade.

Referring to FIGS. 5B and 6, the leading edge segments 34 may include at least one bracing web 54 attached to the inner surface of the skin 36. The bracing webs 54 may extend generally transversely to the longitudinal edges 38, 40 and lend the segment 34 structural rigidity and support. Any manner of internal bracing may be utilized for this reason.

Figure 7:
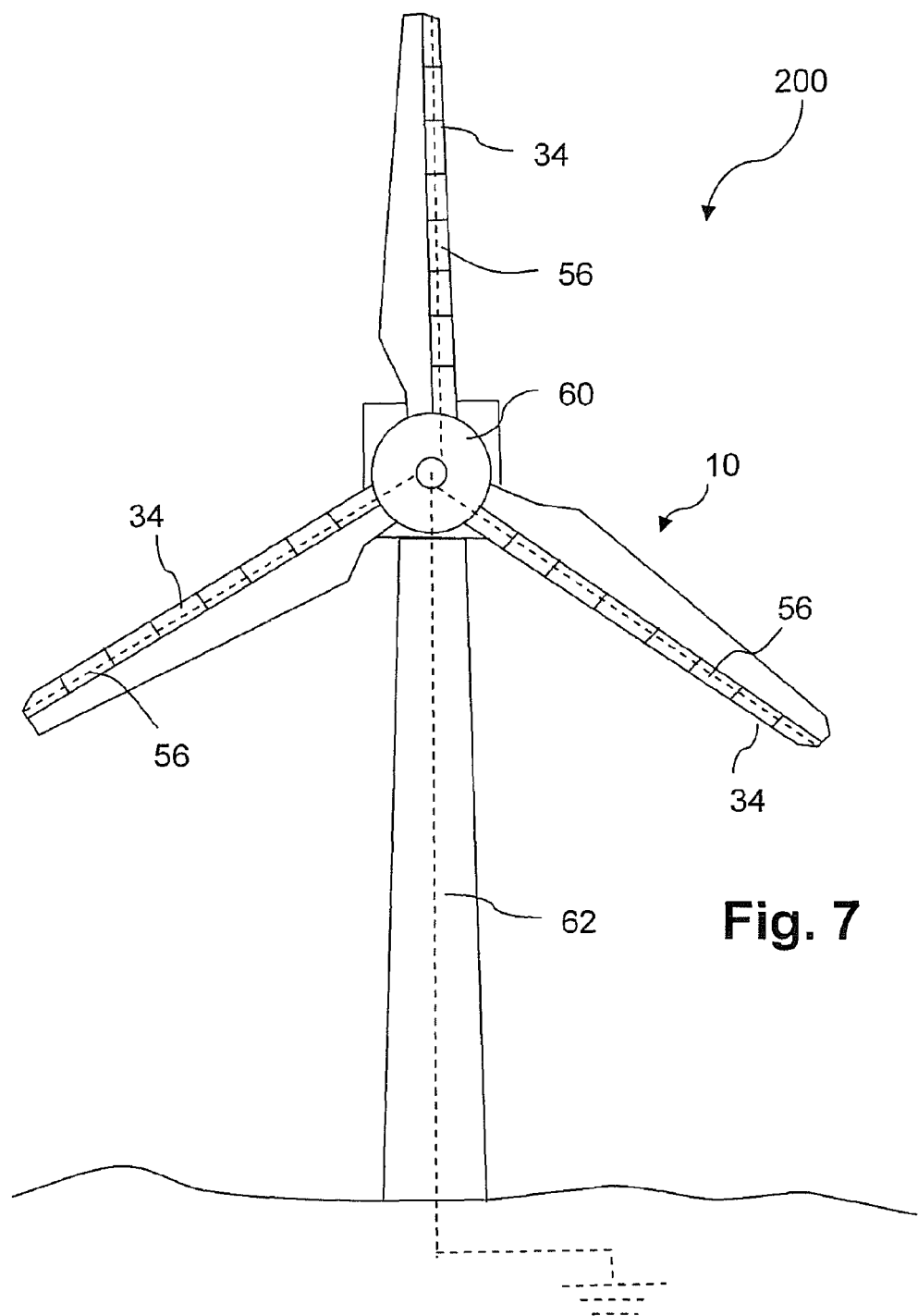
FIG. 7 is a perspective view of a wind turbine incorporating wind turbine blades in accordance with aspects of the invention.

In a particularly unique embodiment, the bracing webs 54 may be formed from an electrically non-conductive material, and include one or more conductive strip members 56 may run longitudinally within the leading edge segment 34. These conductive strip members 56 may join to the conductive strip members 56 of adjacent leading edge segments 34 by way of any manner of conventional connector 58 so as to define a continuous conductive arrangement for all of the leading edge segments 34, as depicted in FIG. 4. A conductive transmission line or member 60 for each blade may connect all of the blades to a common grounded transmission line 62, as depicted in the wind turbine 200 in FIG. 7. Thus, with this unique embodiment, the leading edge segments also provide lightning strike protection to the blades 10, and wind turbine 200. The conductive strip members 56 may be any manner of conductive member, such as a cable, wire, or the like. In certain embodiments, the conductive strip members 56 may be relatively rigid rod-like members that also add structural rigidity and support to the individual leading edge segments 34. In certain embodiments, the conductive strip members 56 may be longer than a single leading edge segment 34, allowing for the possibility of a conductive strip member 56 that may extend along a plurality of the edge segments 34, or along all of the edge segments 34. Thus, a plurality or all of the leading edge segments may be threaded on a single conductive strip member 56. Longer conductive strip members 56 may be desired for increased structural rigidity and support to the edge segments 56, and the leading edge 32 of the blade 10 in general.

It should be appreciated that the present invention also encompasses a kit for forming a wind turbine rotor blade 10 as depicted in FIGS. 3 and 4. This kit may include the components discussed above in their unassembled or disconnected state. Thus, the kit may include a first shell component 18, and a second shell component 24, and one or a plurality of the leading edge segments 34 as described above. The kit may include any number of the components in a completely unassembled or partially assembled state. With this kit configuration, when assembled, the parts define a blade 10 as depicted in FIGS. 3 and 4 with a leading edge 32 that is continuous and unbroken between bond lines 44 and 46, as depicted in FIG. 5B.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine rotor blade, comprising:
   a first shell component, and a second shell component, said shell components joined together at a trailing edge of said blade, each of said shell components further comprising a forward edge;
   at least one leading edge segment joined to said shell components and aligned along a longitudinal length of said blade, said at least one leading edge segment defining a continuous leading edge of said blade;
   said at least one leading edge segment comprising an arcuate cross-sectional profile defined by a skin having first and second longitudinal edges and first and second end faces;
   said longitudinal edges of said at least one leading edge segment joined to said forward edge of said first shell component at a first bond line, and joined to said forward edge of said second shell component at a second bond line; and
   whereby said leading edge of said blade between said first and second bond lines comprises a continuous unbroken surface defined by said at least one leading edge segment.

2. The wind turbine rotor blade as in claim 1, comprising a plurality of said leading edge segments aligned along the longitudinal length of said blade and defining said continuous leading edge of said blade, and wherein said end faces of adjacent said leading edge segments are bonded together.

3. The wind turbine rotor blade as in claim 1, wherein said at least one leading edge segment is prefabricated as a single piece of skin material.

4. The wind turbine rotor blade as in claim 3, wherein said skin material comprises different weathering or erosion properties as compared to said shell components.

5. The wind turbine rotor blade as in claim 1, further comprising longitudinally extending spar caps attached to said first and second shell components, and a shear web extending between said spar caps along the length of said blade.

6. The wind turbine rotor blade as in claim 5, wherein said first and second bond lines are forward of said spar caps in a direction towards said leading edge of said blade.

7. The wind turbine rotor blade as in claim 1, wherein said at least one leading edge segment is open-ended and further comprises at least one bracing web attached to an inner surface of said skin and extending transverse to said longitudinal edges.

8. The wind turbine rotor blade as in claim 7, further comprising a conductive strip member connected to said bracing web and disposed longitudinally within said skin member, said conductive strip member being grounded such that said leading edge segment contains a lightning strike protection system.

9. The wind turbine rotor blade as in claim 8, comprising a plurality of said leading edge segments aligned along the longitudinal length of said blade and defining said continuous leading edge of said blade, and wherein said end faces of adjacent said leading edge segments are bonded together, each of said plurality of leading edge segments containing a respective said conductive strip member, and wherein said conductive strip members of adjacent said leading edge segments are electrically connected and grounded such that said plurality of leading edge segments define a lightning strike protection system.

10. The wind turbine rotor blade as in claim 9, further comprising connectors between said conductive strip members of adjacent said leading edge segments.

11. The wind turbine rotor blade as in claim 8, wherein said conductive strip member comprises a rigid member that provides structural rigidity to said at least one leading edge segment.

12. A kit for forming a wind turbine rotor blade used on a wind turbine, comprising:
a first shell component, and a second shell component, said shell components having a forward edge and a trailing edge;
at least one leading edge segment having an open-ended cross-sectional profile defined by an arcuate skin having first and second longitudinal edges and first and second end faces;
said at least one leading edge segment and said first and second shell components configured relative to each other such that when assembled, said shell components define a bonded trailing edge of the blade, and said longitudinal edges of said at least one leading edge segment are joined to said forward edge of said first shell component at a first bond line, and joined to said forward edge of said second shell component at a second bond line; and
whereby a leading edge of said blade is a continuous unbroken surface defined by said skin of said leading edge segment between said first and second bond lines.

13. The kit as in claim 12, comprising a plurality of said leading edge segments that longitudinally align to define said leading edge of said blade, and wherein said end faces of adjacent said leading edge segments bond together in the assembled blade.

14. The kit as in claim 12, wherein said at least one leading edge segment is prefabricated as a single piece of skin material.

15. The kit as in claim 14, wherein said skin material comprises different weathering properties as compared to said shell components.

16. The kit as in claim 12, further comprising longitudinally extending spar caps attached to said first and second shell components, and a shear web extending between said spar caps along the length of said shell components.

17. The kit as in claim 16, wherein said forward edges of said shell components are forward of said spar caps in a direction towards said leading edge of said blade.

18. The kit as in claim 12, wherein said at least one leading edge segment comprises at least one bracing web attached to an inner surface of said skin and extending transverse to said longitudinal edges.

19. The kit as in claim 18, further comprising a conductive strip member connected to said bracing web and disposed longitudinally within said skin member, whereby in an assembled state of said kit, said conductive strip member is grounded and provides lightening strike protection to said blade.

20. The kit as in claim 19, comprising a plurality of said leading edge segments that align along the longitudinal length of said blade to define said leading edge of said blade, each of said plurality of leading edge segments containing a respective said conductive strip member, and wherein said conductive strip members of adjacent said leading edge segments electrically connect and are grounded so as to provide lightning strike protection to said blade.

21. The kit as in claim 19, wherein said conductive strip member comprises a rigid member that provides structural rigidity to said plurality of leading edge segments.

* * * * *